March 8, 1960 D. J. DE GELLER 2,927,973

MAGNETIC TRANSDUCER

Filed Aug. 26, 1955

INVENTOR.
DONALD J. DEGELLER

BY John B. Aponsler
AGENT

United States Patent Office 2,927,973

Patented Mar. 8, 1960

2,927,973

MAGNETIC TRANSDUCER

Donald J. De Geller, Redwood City, Calif., assignor to International Business Machines Corporation, New York, N.Y., a corporation of New York Application August 26, 1955, Serial No. 530,833

5 Claims. (Cl. 179—100.2)

This invention relates to magnetic transducers. The invention is an improvement of an invention described in copending application Serial No. 536,208 filed September 23, 1955.

In one form of magnetic recording, data is stored on a magnetic record such as a tape, drum, or disk in the form of small magnetized spots or bits. To conserve record space the bits ideally are recorded together as close as possible. To do this, however, requires that the recording transducer be capable of producing a strong but spatially restricted magnetic field. In the prior art a variety of transducers have been employed which employ devices for generating fields that are initially restricted within certain predetermined spatial limits. In the present invention spatial restriction of the magnetic field is obtained with a novel disabling device which employs a second magnetic field generating element spaced farther away from the recording surface than the primary magnetic field generating element arranged in phase canceling relationship therewith to partially disable the primary magnetic field at the record. In the present invention proper placement of the primary and secondary magnetic field producing elements can be arranged to cause a predetermined cancellation of the peripheral segments of the total field produced by the transducer. This effect, therefore, effectively narrows the width of the magnetic field.

Accordingly, an object of this invention is to provide an improved magentic transducer with a magnetic field producing element arranged to coact with a second phase opposed magnetic field producing element positioned laterally to the first element and spaced a greater distance away from the record to disable the effect of the magnetic field produced at the magnetic recording record in one area more than in the other.

Another object is to provide an improved magnetic transducer.

Another object of the invention is to provide a transducer having two phase canceling magnetic field producing elements arranged so that one of the magnetic field producing elements is closer to the record surface than the other.

And still another object of the invention is to provide a magnetic transducer with an element contained therein which substantially cancels the peripheral portions of the magnetic field produced at the record by the transducer.

Other objects of the invention will be pointed out in the following description and claims and illustrated in the accompanying drawings which disclose, by way of example, the principle of the invention and the best mode which has been contemplated of applying that principle.

Figure 1:
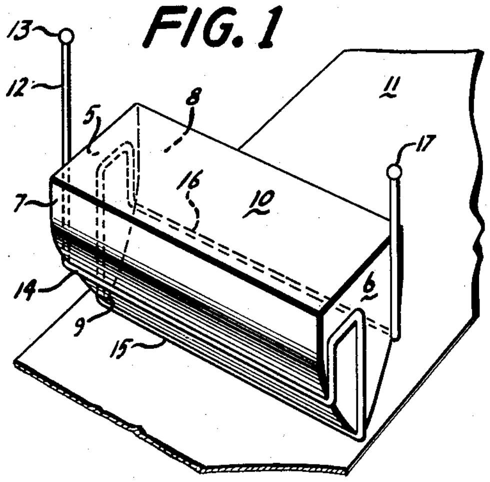
Fig. 1 is a perspective view of an embodiment of the invention.

Referring to Fig. 1, a block 10 made of a non-magnetic material is provided to form the base for the transducer. The block 10 is arranged to ride above a relatively moving magnetic record 11 by the use of a suitable transducer supporting mechanism. The block 10 is wedge shaped and therein has two sides 7 and 8 which converge at an edge 9. The block 10 is held above the record by the supporting mechanism so that the edge 9 is disposed with the length at right angles to the relative direction of travel of the record 11. A conductor 12 is wound on the block 10 to provide magnetic field producing members. The conductor 12 runs from an input terminal 13 down an end 5 of the block 10 and then crosses over side 7 to form a stretch 14 which is parallel to the edge 9 but spaced laterally thereto and upwardly therefrom. The conductor 12 then passes downwardly along an end 6 of the block 10 and then travels along the edge 9 forming a stretch or length 15. After termination of the length 15, the conductor 12 runs along the end 5 and travels along the side 8 parallel to and on a common plane with the stretch 14, therein forming a stretch 16 and then terminates at a terminal 17.

Figure 5:
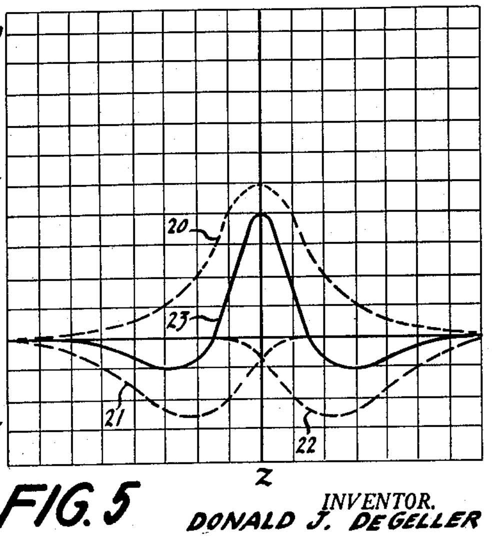
Fig. 5 is a graph of the transducer of Figs. 1 and 3 showing a surface flux density on the surface of the magnetic record with respect to linear distance on either side of a perpendicular from the record to a central portion of the transducer.

When a voltage is applied across terminals 13 and 17, the direction of the current flow in the conductor 12 with respect to the length of the block 10 will be in one direction in the lengths 14 and 16 and will be in the opposite direction in the length 15. As is well known, the direction of current flow in a conductor determines the direction of magnetic flux emitted from the current carrying conductor. As a result the lengths 14 and 15 are in phase canceling relationship wherein the flux lines produced by the length 15 and by the length 14 will cancel each other within their respective spheres of flux. The length 16 and the length 15 are in similar phase canceling relationship. The lengths 14, 15, and 16 are all of substantially equal dimension and are provided with equal current. They, therefore, produce flux densities which are each equal to one another. The lengths 14 and 16, however, via the supporting block 10 are located farther above the record 11 than the length 15. It is also well known that the intensity of the magnetic field which emanates from a conductor decreases with the square of the distance. Therefore, the field produced by the length 15 although equal to the fields produced by the lengths 14 or 16 is substantially stronger at the record 11 because of the length 15 being in closer proximity to the record. Some magnetic field, however, is produced at the record by the length 14 and the length 16 which causes an interfield effect between the fields from the three lengths. The lesser field of the lengths 14 and 16 being phase opposed to the field of the length 15 will, to the extent that the fields overlap, cause the stronger field from length 15 to be reduced accordingly. Referring to Fig. 5, the effective interrelation of the magnetic fields is illustrated in which the flux densities at the record 11 produced by the length 15 is illustrated by curve 20. The flux density at the record produced by the length 14 is illustrated by curve 21 and the flux density produced by the length 16 is illustrated by curve 22. The ordinates of the curves 20, 21, and 22 represent the flux densities to the record 11 with the ordinate 0 being zero flux, and the ordinates above being flux of one polarity and the ordinates below the ordinate 0 being of the other polarity.

The abscissas of the curves are illustrative of the distance to the left or the right from a perpendicular from the length 15 with the midpoint of the perpendicular being designated by the ordinate Z. The curves 21, 22, and 20 represent flux densities at the record 11 for each length without consideration of the interfield effect of the lengths upon one another at various points to the right or left of the midpoint Z. A curve 23 illustrates the flux density produced at the record of the combined flux produced by the lengths 14, 15, and 16 interacting together.

On the peripheral portion of the transducer field on the record 11 the length 14 or the length 16 produces predominant flux densities which completely disable magnetic flux produced from the length 15. This is caused because the distance between the lengths 14 or 16 to the peripheral points on the record is linearly less than the distance to the peripheral points from the length 15. Inwardly, toward the abscissa Z flux from the lengths 14 and 16 decreases, and flux from the magnetic field of length 15 predominates to produce a suitable and yet spatially narrowed field of flux at the record 11.

The lateral displacement of the wires 14 and 16 on either side of the length 15 and the relative distance between the lengths and the record will vary the degree of interfield cancellation; however, in cases when there is an interfield effect there will be a narrowing of the effective width of the primary field produced by the length 15.

Figure 2:
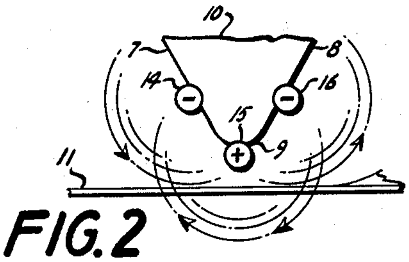
Fig. 2 is a schematic view of Fig. 1.
Figure 3:
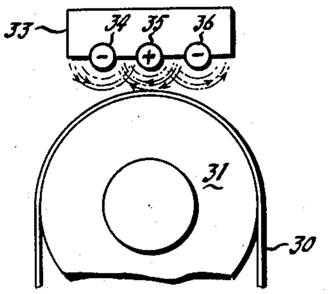
Fig. 3 is a schematic view of another embodiment of the invention.

Referring to Fig. 3, another embodiment of the invention has a magnetic tape 30 provided over a drum 31. A transducer 33 is mounted above the drum and is provided with a wire having three lengths 34, 35, and 36 which are in a parallel plane with the transducer 33 and run at right angles to the direction of travel of the tape 30. The transducer is mounted tangentially to the record so that the length 35 is closest to the tape 30. The lengths 34 and 36 are, therefore, held in a further spatial relation to the tape than the length 35 due to the curvature of the tape 30 over the drum 31. The lengths 34 and 36 are in phase assisting relation and in phase canceling relation to the length 35 in the same manner as the lengths 14 and 16 are in phase assisting relation and in phase canceling relation to the stretch for the length 15 in Figs. 1 and 2. As the outside lengths 34 and 36 in Fig. 3 are farther away from the recording surface of the tape 30, the same effect is therein created as was disclosed above in connection with Figs. 1 and 2. The graph of Fig. 5, therefore, provides a comparable illustration of the flux densities produced at the record 11 by the transducer 33 with the length 34 being represented by curve 21, length 36 being represented by curve 22, and curve 20 being representative of length 35. The total combined effect of the transducer 33 to the record 30 is therein represented by the curve 23.

Figure 4:
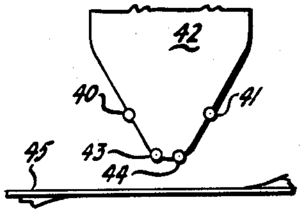
Fig. 4 is a view of still another embodiment of the invention.

Referring to Fig. 4, a transducer with a block 42 substantially identical to the block 10 described above in connection with Figs. 1 and 2 is provided with a length 40 and a length 41 on either side of the block, and lengths 43 and 44 are provided in close parallel alignment nearer to a record 45 than the lengths 40 or 41. The lengths 40 and 41 are in phase assisting relation in that current is arranged to run in the same direction through the lengths 40 and 41 with respect to the block 42. Similarly the lengths 43 and 44 are in phase assisting relation. The phase relationship, however, of the lengths 40 and 41 is opposed to the phase relationship with the lengths 43—44.

Figure 6:
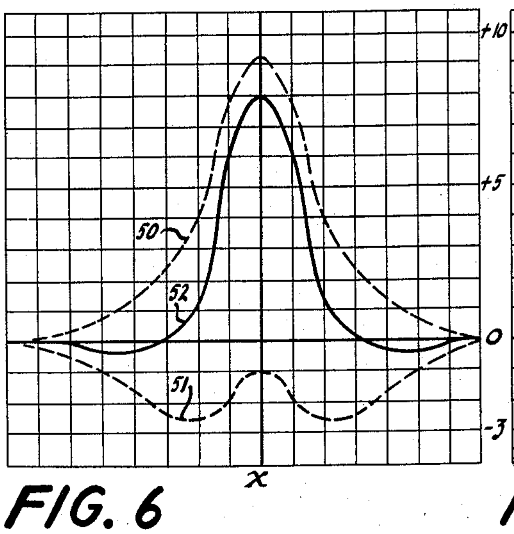
Fig. 6 is a graph similar to the graph of Fig. 5 but showing the flux density of the embodiment of Fig. 4.

The combined magnetic field intensity at the record 45 (referring to Fig. 6) of the lengths 43 and 44 is represented by a curve 50. The field intensity of the combined lengths 40 and 41 is represented by the curve 51. The combined effect of the four lengths is represented by the curve 52. The ordinate of the curves 50, 51, and 52 represent the flux densities at the record 11, and the abscissas of the curves indicate the distance from the left or right to the perpendicular from a point on the record directly intersecting the lengths 43 and 44 with the midpoint of the perpendicular being designated by the ordinate X.

In this embodiment, the lengths 43—44 closest to the record produced a signal strength by virtue of number of turns and closeness to record. The outside lengths 40 and 41 each have less turns than the combined lengths 43 and 44, and each is farther from the record 11 than the lengths 43 and 44. The lengths 43 and 44, therefore, produce a generally stronger field at the record. The effect of the lengths 40 or 41 on the fields produced by the lengths 43 and 44 at the peripheral sections is sufficiently strong, due to the relative linear distance between the lengths 40 or 41 from the peripheral segments of the record as compared with the linear distance between the peripheral segments of the lengths 43 and 44 and the greater number of turns, to cause the field from the lengths 40 or 41 to predominate. In the central section near the ordinate X, the lengths 43 and 44 overwhelmingly predominate causing a sharp rise in magnetic flux travel on either side of the ordinate X. It is noted that the curve 52 in over-all dimension is considerably narrower than the curve 50, and that the strength at the apex of intensity at the central area of the curve 50 is not as much dimensioned as on the peripheral portions thereof.

Other combinations of spatial relationships between lengths of wire and the recording surface and variations of relative number of turns or amount of current flow through the various wires can be changed to affect the hereinabove described relationship. The proper operation of the device requires a relatively strong central or primary magnetic field producing element which is disabled by a relatively weaker magnetic field producing element arranged in phase opposed relationship so that the peripheral portion of the primary field produced at the record is canceled more than the central portion, therein effectively narrowing the magnetic field available for writing on the magnetic record.

While there have been shown and described and point out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A magnetic transducer for a magnetic record comprising a first and second magnetic field producing means both being positioned to magnetically coact with the record; said first and second means being interconnected in phase canceling relation; and non-magnetic supporting means holding said first and second means in fixed relative alignment with said first means being disposed closer to the record than said second means.

2. A transducer for recording on a magnetic record comprising a first magnetic field producing means and a second magnetic field producing means; a non-magnetic supporting member to hold said first and second means in fixed relative alignment; said first and second means being interconnected in phase canceling relation; and control means for causing said first means to produce a greater amount of magnetic flux in the magnetic record than said second means when said first and second means are subjected to an equal electrical energization; said control means being operatively associated with the support member such that said second means is held by said member laterally to said first means and farther from the record than said first means.

3. A transducer for recording on a relatively moving magnetic record comprising a first magnetic field producing means spaced a predetermined distance above the record; a second magnetic field producing means on the leading side of a perpendicular from the record to said first means and spaced a greater distance from the record and thereby having less magnetic effect upon the record than said first means; a third magnetic producing means on the trailing side of the perpendicular and spaced a greater distance from the record and thereby having less magnetic effect on the record than said first means; said first means being in phase opposed relation to said second means and said third means whereby magnetic flux produced at the record by said first means on the leading side of the perpendicular is canceled by said second means and magnetic flux produced by the first means on the trailing side of the perpendicular is canceled by said third means.

4. A magnetic recording transducer for use with a magnetic record, having a body with two sides converging in an edge and a winding of wire for said body having first stretches along each said side and a second stretch along said edge; said first and said second stretches being electrically coupled in phase canceling relationship; the magnetic record moving longitudinally and adjacent the length of the edge of said body with each said first stretch being farther away from said record than said second stretch and thereby producing less magnitude of flux at said record than the magnitude of said second stretch except within a predetermined zone.

5. A magnetic transducer for reading and writing on a magnetic record having a winding having at least three stretches positioned to magnetically coact directly with the record, said stretches being arranged longitudinally to the direction of travel of the record; a first two of said stretches connected together in phase assisting relation and mounted in spaced apart relation; and a third one of said stretches connected to said first two stretches in phase canceling relation between said first two stretches with said third stretch mounted closer to the record than said first two stretches.

References Cited in the file of this patent

UNITED STATES PATENTS

| | | |
|---|---|---|
| 2,539,876 | Von Behren | Jan. 30, 1951 |
| 2,680,156 | Thorensen | June 1, 1954 |
| 2,803,708 | Camras | Aug. 20, 1957 |